Oct. 16, 1962    N. E. ANDERSON    3,059,098
ARC WELDING APPARATUS
Filed April 19, 1960    4 Sheets-Sheet 1

INVENTOR
NELSON E. ANDERSON
BY
ATTORNEY 3,059,098
ARC WELDING APPARATUS
Nelson E. Anderson, Berkeley Heights, N.J., assignor to Air Reduction Company, Incorporated, New York, N.Y., a corporation of New York
Filed Apr. 19, 1960, Ser. No. 23,201
17 Claims. (Cl. 219—131)

This invention relates to apparatus for arc welding and the like and more particularly to arrangements for manual and automatic control and adjustment of such apparatus.

It is an object of the invention to provide a low cost servo system in which the motor mechanism is of small size and embodies a motor which starts and stops substantially instantly with its energization and de-energization to provide instant travel without overtravel of the motor mechanism.

It is also an object of the invention to provide a servo system in which the forward and reverse feeding of an electrode in its holder or of an electrode and its holder relative to a workpiece is obtained by a pair of stepping motors which are selectively rotated in opposite directions in response to arc voltages above and below a desired value to maintain a constant arc length between the electrode and the workpiece.

Another object of the invention is to improve the operation of the servo system when using a particular type of stepping motor controlled by switching means having spark damping circuits connected across its contacts and consequently across the operating windings of the stepping motors.

Another object of the invention is to provide a gas-arc welding torch of improved construction.

Another object of the invention is to provide an arrangement for adjusting the nozzle of a gas-arc welding torch relatively to the surface of a workpiece independently of a concurrent automatic control by which the electrode is automatically positioned in the torch to maintain a constant arc length between the electrode and the workpiece.

In arc welding, the arc is spread out over a more or less definite area within which most of the heat transfer from the arc to the workpiece takes place. In order to properly melt the metal, a constant rate of heat transfer into a unit area of the work is desirable. Too fast a rate may result in burning or melting through the workpiece and too slow a rate will be unsatisfactory or uneconomical due to insufficient heating and too low a temperature.

The rate of heat transfer varies with the length of the arc, the arc fanning out more as the arc lengthens, thereby reducing the heat transfer per unit area. It is desirable, therefore, to maintain a constant arc length in order to have a constant area of the workpiece covered by the arc. As the arc voltage varies directly with the arc length and nearly linearly so over small ranges that are most useful in welding, arc voltage may be taken as a good indication of arc length, particularly for purposes of automatic control of arc length. Incidentally, for a given arc length, the arc current is fixed. The rate of arc voltage change per unit of arc length varies with the kind of shielding gas that is used. For a tungsten arc in helium, the rate is approximately 65 volts per inch, and in argon 15 volts per inch in the normal arc welding voltage range.

A feature of the invention is an arrangement for adjustment of a welding electrode relative to the barrel of a gas-arc welding torch with automatic control to maintain substantially constant arc voltage and substantially constant arc length from the electrode to a workpiece, which latter may have an uneven surface which varies its spacing from the electrode traversed relative thereto; together with independent manual control of the spacing between the nozzle tip of the torch and the workpiece or the carriage or the like upon which the workpiece is supported.

Another feature is a provision whereby the barrel of the torch may be raised or lowered manually while automatic control of the arc length is in effect without interference with such control so that the arc length is maintained constant.

Another feature is that an electrode may be inserted from the top of the torch without disassembling any part of the torch.

A further feature is a readily releasable gripping engagement between the electrode or an extension therefor and the electrode moving device whereby the grip of the moving device thereon may be released and a new grip taken at another location with reference to the length of the electrode which is frictionally secured in its holder in substantially fixed relationship to the workpiece. By virtue of this feature, when the electrode has been lowered in use to or nearly to a point beyond which the electrode moving device cannot go, the grip may be released and the moving device moved upward with respect to the electrode to take a new grip.

Another feature of the invention is a servo system employing two stepping motors mounted on a single shaft to provide rotation in either direction under the control of a differential relay.

A further feature is an electrical interconnection between two stepping motors on a common shaft whereby drag on one motor due to turning the other motor as a generator may be relieved or eliminated.

A further feature is the use of materially unequal voltages for comparison in a differential relay having two electrically isolated windings of unequal numbers of turns, the turns ratio being substantially the same as the ratio of the voltages compared.

An additional feature is the combination of a tubular rack member within a barrel member and means for holding a rod-like electrode member in axial position within the rack member so that the electrode may be moved by the rack member in axial relationship to the barrel member.

Another feature of the invention is a motor mechanism of small size which may be mounted on the barrel of an arc welding torch for moving an electrode therein lengthwise of the torch barrel to space it from a workpiece relative to which the torch barrel is supported or on which the barrel of the torch may be mounted to move the entire torch relatively to a workpiece to space an electrode in the torch from a workpiece relative to which the motor mechanism is supported.

Other features, objects and advantages will appear from the following more detailed description of an illustrative embodiment of the invention, which will now be given in conjunction with the accompanying drawings.

Figures 1, 10:
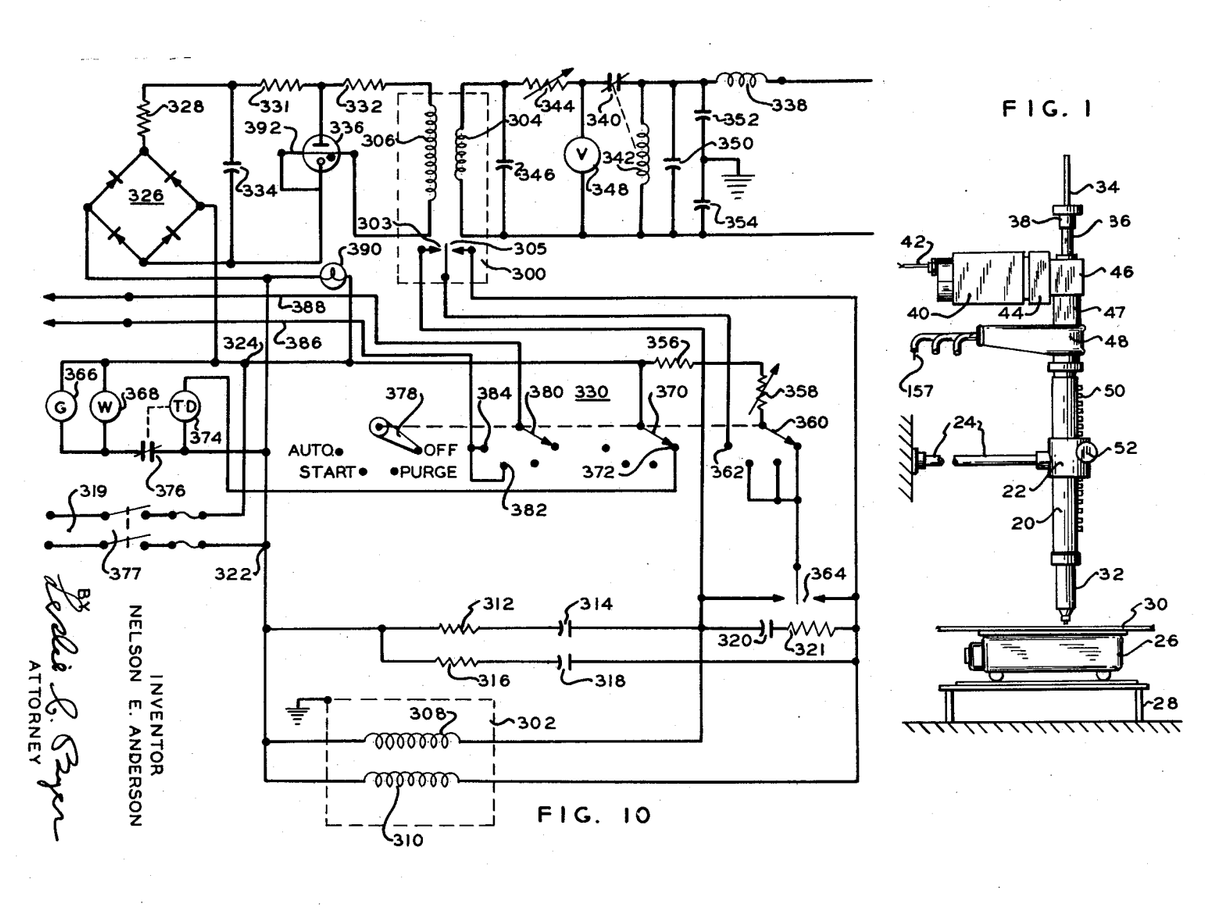
FIG. 1 is a general elevational view of a welding machine embodying inventive features described herein.
FIG. 10 is a schematic diagram of an automatic control or servo system for controlling the head shown in FIGS. 2 through 5 in order to maintain a substantially constant arc voltage and arc length.

Referring to FIG. 1, there is shown a welding machine mounted as for automatic welding. A barrel member 20 of a gas-arc welding torch is shown encircled by a collar 22, the latter being fastened to or integral with a bracket 24 mounted upon a fixed support such as a portion of the main frame of the machine. A carriage 26 for supporting and moving a workpiece through the machine is mounted for longitudinal motion upon a table or base member 28 which is in turn mounted upon a support in fixed relationship to bracket 24. A workpiece such as a sheet of metal is shown at 30. Attached to the bottom of the barrel 20 is a gas nozzle 32. An electrode is accommodated within the barrel and nozzle. The electrode may protrude from the nozzle, terminating at a desired distance from the workpiece to determine a suitable arc distance according to the nature and requirements of the work. The electrode may be attached at its upper end to an extension rod 34. In the members shown above as well as in the barrel itself there is provided a clear central inner space so that the upper end of the extension rod may extend through and above the top of the surrounding members. In the figure, the rod 34 is shown extending through a shaft 36 which is tubular and a knob 38 which has a central cylindrical bore.

An electrically controlled stepping motor is represented at 40 with incoming electrical connection at 42. The motor is connected through a gear box 44 to an electrode moving head 46 through which the rod 34 passes. Connecting the head 46 and the barrel 20 are a plurality of members surrounding the rod 34 or the attached electrode. These members include an insulating block 47 and a conductive transfer block 51 (FIG. 6), the latter being covered by an insulating boot 48. Through the boot 48 and block 51, welding current, cooling water and arc shielding gas connections are introduced into the barrel 20. On the outer surface of the barrel is mounted a rack 50 which engages a pinion within the collar 22. A knob 52 attached in driving relation to the pinion is provided for manually moving the entire barrel, head and electrode mounting apparatus up and down with respect to the main frame.

Figure 2:
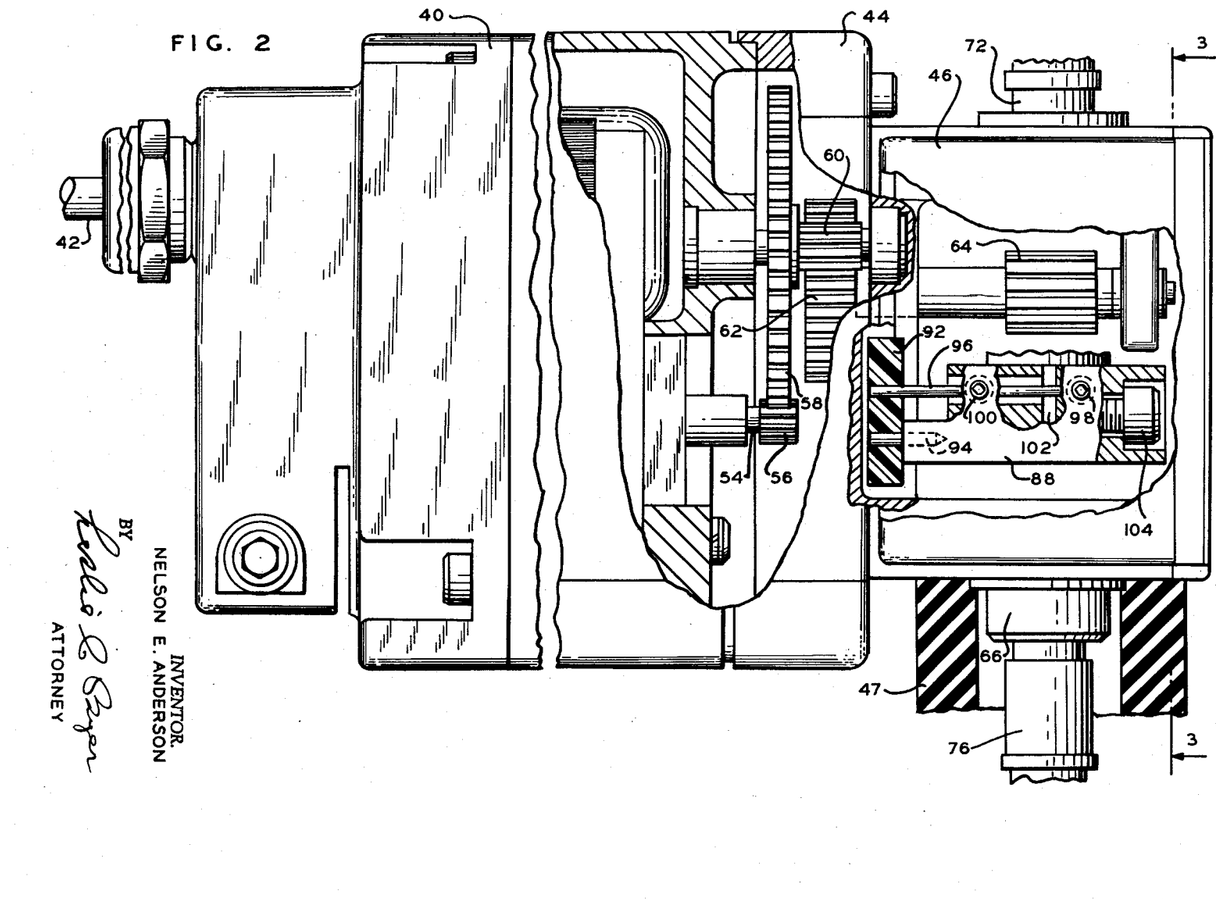
FIG. 2 is an elevational view, partly broken away and partly in section, showing a motor head and gearing for moving an electrode or an electrode holder and attached electrode relatively to a workpiece.
Figures 3, 4, 5, 8:
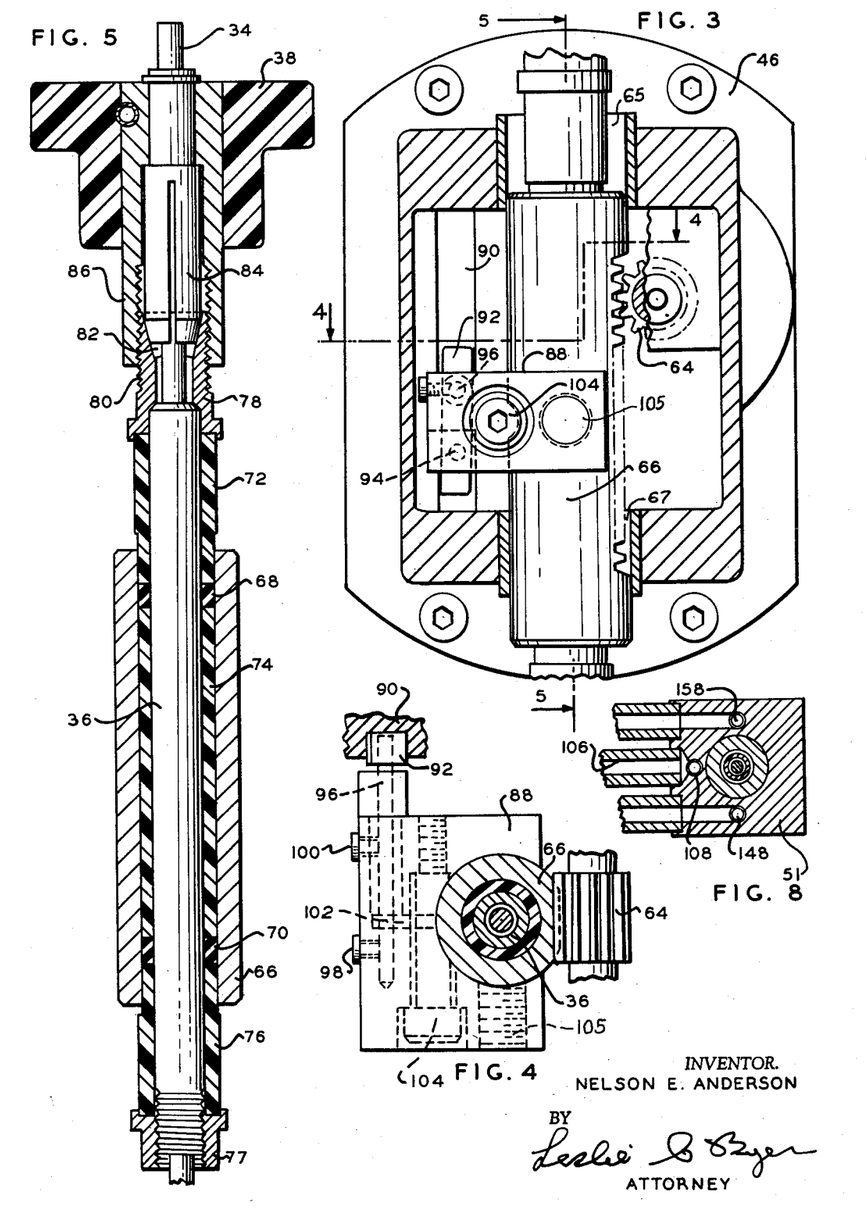
FIG. 3 is an elevational sectional view of a portion of the head shown in FIG. 2 as viewed along the line 3—3 in that figure showing details of a rack and pinion for moving the electrode holder or an electrode within the holder.
FIG. 4 is a sectional view taken along the line 4—4 in FIG. 3 showing means for preventing rotation of a cylindrical rack member.
FIG. 5 is an elevational sectional view along the line 5—5 in FIG. 3 showing the rack and a portion of an electrode holder.
FIG. 8 is a sectional view on a reduced scale along the line 8—8 in FIG. 6 showing connections for the cooling water and shielding gas for operating a gas-shielded arc.

The output shaft of the motor 40 is shown at 54 in FIG. 2, in driving relationship to a train of reducing gears 56, 58, 60, 62, 64. The gear 64 is a pinion which engages a rack 66 as shown in FIGS. 3 and 4. The rack 66 is enclosed in the electrode moving head 46 and is hollow cylindrical in form with teeth cut into a flattened portion along one side of the cylinder. Inside the hollow member 66 is releasably engaged the shaft 36 as shown in FIGS. 4 and 5. The engagement between the shaft 36 and the member 66 is secured by means of resilient rings 68, 70 (FIG. 5) surrounding the shaft and compressed to frictionally engage the shaft and the member 66. The rings 68, 70 are respectively positioned between sleeves 72 and 74 and between sleeves 74 and 76 which sleeves surround the shaft 36 and occupy the space between the shaft and the inner surface of the member 66. A nut 77 which may be tubular with two or more flat portions for wrenchgrip, makes a threaded engagement with the shaft 36 at the bottom of the shaft. A shouldered member 78 is attached to the upper end of the shaft 36. By turning the nut 77 the assemblage comprising sleeve 72, ring 68, sleeve 74, ring 70 and sleeve 76 may be crowded together thereby expanding the rings 68 and 70 to frictionally engage and make shaft 36 integral with rack 66. The sleeves 72, 74, 76 and rings 68, 70 are preferably of electrically insulating material.

Figures 6, 7, 9:
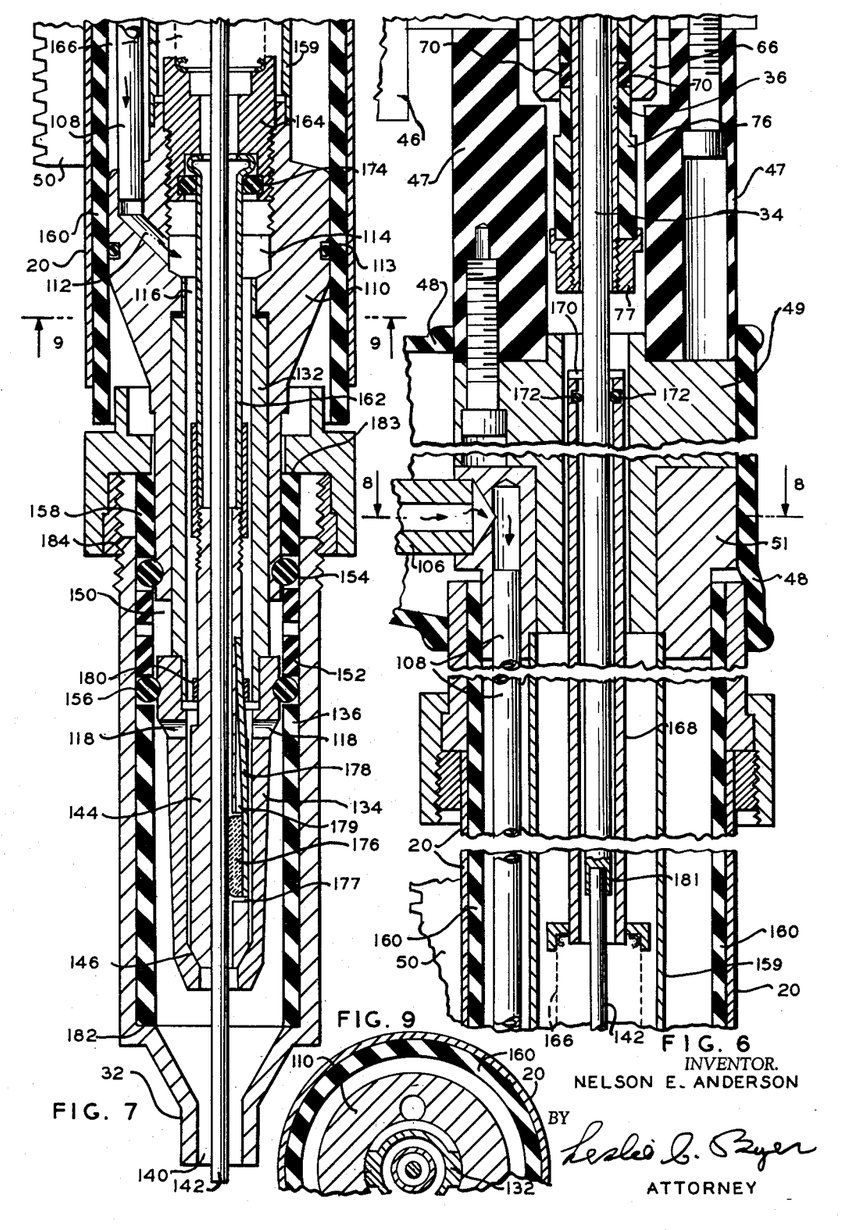
FIG. 6 is an elevational sectional view showing the lower portion of the electrode holder and a portion of a barrel member which encloses the electrode holder.
FIG. 7 is an elevational sectional view showing the lower portion of the barrel and further details of the electrode holder including a spring-pressed adjustable electrical contact shoe for supplying welding current to an electrode in the electrode holder.
FIG. 9 is a sectional view along the line 9—9 in FIG. 7 showing inner passages for the cooling water and shielding gas.

A readily releasable engagement is provided between the shaft 36 and the rod 34 carrying the electrode. For this purpose the member 78 is exteriorly threaded at 80 and has an interior conical seat 82. A hollow cylindrical collet 84 is rotatably secured within a cylindrical bore in the knob 38 and extends into the seat 82. An interiorly threaded member 86 integral with the knob 38 engages the exteriorly threaded portion 80 of the member 78. By turning the knob 38 the jaws of the collet may be tightened against the seat 82 and made to grip the rod 34 which has approximately the same diameter as the inner bore of the collet. Thus by tightening or loosening the knob 38, the rod 34 may be coupled or decoupled with respect to the shaft 36 and consequently the rod 34 and attached electrode may be made movable under the control of the motor 40 or removed from such control. In FIG. 6, the nut 77 and the bottom of the rack 66 are seen extending down into the interior of the insulating member 47 which is intermediate between the head 46 and a conductive member 49 to which latter is attached the conductive transfer block 51.

The cylindrical rack member 66 may be slidably mounted as in cylindrical bearings 65 and 67. To secure the cylindrical rack member 66 against rotation about its longitudinal axis while not interfering with its necessary longitudinal motion, a block 88 is provided as shown in FIGS. 2, 3 and 4. The block fits around the greater part of the circumference of the rack member 66 and is attached thereto. A groove 90 is provided in the casing of the head 46 running parallel to the longitudinal axis of the rack member. A rectangular block 92 is arranged to slide in the groove 90. A pin 94 serves to mount the block 92 rotatably upon the block 88 allowing pivotal motion of the block 92 about the pin. A rod-shaped spring 96 is mounted parallel to the pin 94 and extends into a socket in the block 92. The end of the spring 96 remote from the block 92 is secured in the block 88 by a set screw 98. Another set screw 100 bears against the spring 96, in such direction as to urge the block 92 in yieldable rotation against opposite sides of the groove 90, thereby yieldably opposing any material rotation of the rack member.

The block 88 may be of split construction with a grooove 102 and a screw 104 for tightening the block about the rack member 66.

Referring now to FIGS. 6–9, shielding gas is introduced through a nipple 106 in the transfer block 51 into a connecting tube 108. The lower end of the tube 108 connects through a channel 112 in the wall of a lower body member 110 into a central void 114 in that member. The void 114 opens into the interior of a finned tube 132 which in turn opens into the interior void of a sleeve 134. A plurality of radial bores 118 lead from the interior of the sleeve 134 into a space between the sleeve and a nozzle liner or spacer 136. This space leads into the interior of the gas nozzle proper 32 and to the nozzle orifice 140 from which the gas may emerge to form a shield about the electrode 142 and the arc. The opening at the lower end of the sleeve 134 is substantially blocked by the electrode and a contact tube 144, the latter seating firmly in the sleeeve at 146. Consequently, the gas is forced out through the holes 118 and directed down onto the weld by the nozzle.

Cooling water is introduced through a nipple in the transfer block 51 into a connecting tube 148 (FIG. 8) which may be similar to the gas tube 108. The bottom of the tube 148 connects through a channel in the lower body into a space between one side of the finned tube 132 and the wall of the lower body. The water flows down the length of the finned tube, on one side only, into a space 150 surrounded by a cylindrical spacer tube 152. Sealing rings 154 and 156 respectively located between tubes 152 and 158 and tube 152 and liner 136, when compressed by screwing nozzle 32 in its support, complete the water passage space 150 between opposite sides of the finned tube 132. For convenience in illustration, the rings 154 and 156 have been shown before being deformed by clamping between members 136, 152 and 158. The tube 152 is perforated to permit the water to cool the inner surface of the nozzle within the confines of the rings. The water then flows back up the other side of the exterior of the finned tube 132, through another channel in the lower body, through another connecting tube 158 (FIG. 8) into the transfer block 51 and out through another nipple in the transfer block.

The welding current is introduced through an insulated conductor 157 (FIG. 1) inside a length of hose which is carrying cooling water away from the transfer block. In passing through this hose, the water cools the power conductor. At the transfer block 51 (FIG. 6) the welding current conductor is connected to the block and thus to all the metal parts which are connected to the transfer block including a conductive cylinder 159, lower body member 110, finned tube 132 and sleeeve 134. The transfer block is insulated from contact with the operator by being covered by the boot 48 which may be made of rubber. The entire inner body of the holder is thus energized, but the other barrel 20 is insulated from the inner body by an insulating lining tube 160. The nozzle 32 is insulated from the inner assembly by the nozzle liner 136, the ring spacer 152, the rings 154, 156 and an insulating tube 158. The current is transmitted to the electrode from the sleeeve 134 by the contact tube 144.

A positive electrical contact between the sleeve 134 and the contact tube 144 is provided by virtue of the fact that the tip of the contact tube and the lower end of the sleeve are formed with matching conical seating surfaces at 146 and the two members are tightly pressed together. To exert this pressure, the contact tube 144 is fastened to a coupling member 162 that may be inserted in a cavity in the lower end of a shaft assembly which is threadedly engaged with the lower body member 110. This shaft assembly comprises a threaded head portion 164, a flexible joint member 166 and an extension tube 168. Suitable means such as a screwdriver slot 170 may be provided at the top of the tube 168 for rotating the assembly to tighten the contact tube 144 in the seat 146. The coupling member 162, the head portion 164 and the flexible joint 166 are hollow and in conjunction with the contact tube 144 and the extension tube 168 provide a continuous clear space for the electrode 142 and the electrode extension rod 34. A sealing ring 172 for gas is provided between the electrode extension rod 34 and the extension tube 168 near the top of the latter. A flexible coupling ring 174 is provided in the head portion 164 of the shaft assembly below the rounded upper flange of the coupling member 162 to provide a separable plug-in connection for contact tube 144. A sealing ring not shown may be provided between head 164 and cylinder 159. This ring and ring 172 will prevent upward flow of gas from nozzle 32 and aspiration of air into the nozzle from the upper end of the torch structure.

Positive electrical contact between the contact tube 144 and the electrode 142 is provided by means of a pressure shoe 176 which may be made of a suitable ceramic material. The shoe 176 is loosely confined within a slot 177 in the contact tube and is pressed against the electrode by means of a spring 178. The spring is bent as shown and lies in a lengthwise groove 179 in the outer surface of the contact tube. The end of the spring away from the shoe is restrained by the end of the groove 179 and by a ring 180. The pressure of the shoe against the electrode may be adjusted by sliding the ring 180 along the surface of the contact tube. The shoe 176 presses the electrode against one side of the interior bore of the contact tube to make electrically conductive contact therewith.

The contact tube 144 may be installed or replaced after removing the parts above the transfer block 51. The shaft assembly may be unscrewed and drawn out of the barrel from the top together with the coupling member 162 and contact tube 144 attached thereto. The rounded upper flange of the coupling member may be snapped out past the coupling ring 174 and the contact tube may be unscrewed from the coupling member. To assemble, a contact tube may be secured to the coupling member and the coupling member may be snapped in past the coupling ring. The entire assembly may then be lowered into the barrel and screwed in place with sufficient tightness to properly seat the contact tube in the lower end of the sleeeve 134.

An electrode may be installed or replaced without disassembling any other parts. To do this, the knob 38 is loosened, thereby relieving pressure on the collet 84. The electrode extension rod 34 and the attached electrode 142 may then be withdrawn from the top. The sealing ring 172 and the pressure of the shoe 176 constitute frictional means for yieldingly securing electrode 142 in its holder in substantially fixed relationship to the workpiece and exert the only restraints to removal of the electrode and these are easily overcome by hand. The electrode diameter is smaller than the diameter of the extension rod, and the central spaces through which the electrode and the extension rod must pass all provide a small but sufficient clearance to permit easy removal even though there may be some incrustation or roughness at the tip of the electrode due to use in welding. When required, the electrode may be removed from the extension rod and a new electrode attached, as by brazing. A socket 181 is provided in the lower end of the extension rod of proper size to fit the electrode. The extension rod with electrode attached may be lowered into the barrel through the central hole in the knob 38 and slid past the ring 172 and the shoe 176 until the lower tip of the electrode is located at the desired position relative to the gas orifice 140. The knob 38 may then be tightened until the collet is lowered into the seat 82 to a position where it firmly grips the extension rod 34.

To provide a water-tight seal for the water cooling passage 150, the gas nozzle 32 is provided with an interior shoulder 182 and a threaded engagement with the barrel assembly at 184. The bottom of the nozzle liner 136 fits against the shoulder 182 and the insulating tube 158 abuts against a portion 183 of the barrel assembly at the top. When the nozzle is screwed into engagement with the barrel assembly, the liner 136, sealing ring 156, spacer 152, sealing ring 154 and insulating tube 158 are crowded together, thereby deforming the rings 154 and 156 to form a water-tight seal.

A spacing ring 113 may be provided in a groove in the outer surface of the lower body member 110 to align the member 110 in the insulating barrel 160.

In the servo system shown in FIG. 10, a null-seeking differential polarized relay 300 is provided to compare a voltage representative of the voltage of a welding arc or other voltage sensitive device with a standard voltage derived from a regulated power supply. The relay 300 controls a supply of alternating current to a pair of stepping motors forming a unit 302. The motors are coupled to a single shaft and are arranged to turn the shaft in one direction or the other according to which motor is being energized at any given instant.

The voltages compared in the relay 300 need not be approximately equal. In an illustrative example in arc welding, for instance, a voltage of six volts may represent a desired operating condition of the arc. A suitable standard voltage of required constancy may be one derived from a power line, for example, a 110-volt alternating current system, together with a rectifier and a voltage regulating gas-filled vacuum tube. Gas-filled tubes of this sort are commercially available for operation at arbitrarily set standard voltages, one, known as the OA3/VR75, a neon tube suitable for use with a 110 volt supply, being designed to maintain a standard of 75 volts. By means of a voltage divider and the 75 volt neon tube, for example, a 60 volt standard may be established. The 6 volt sample from the arc circuit may be compared with the 60 volt standard by providing the relay with operating windings of unequal number of turns, in this case in the ratio of 1 turn to 10. The relay assumes a null position when the numbers of ampere-turns of the two windings are the same. Then a small current in the 60-volt winding produces the same number of ampere-turns as a current ten times as great in the 6-volt winding. The relay has a pivoted armature that is biased to a balanced position. When the ampere-turns are different in the two windings, the armature is tilted in one direction or the other. Tilting the armature in one direction causes a contact or set of contacts to be altered and tilting the armature in the other direction causes another contact or set of conacts to be altered. When the ampere-turns in the two windings are approximately equal, the bias holds the armature in the balanced position with the contacts in their respective unaltered states. In the arrangement shown in FIG. 10, one normally open contact is employed at each end of the armature, the respective contact being closed when the armature is tilted toward that end. The effects of the two windings upon the armature are opposed to each other, one winding tending to tilt the armature in one direction and the other winding tending to tilt the armature in the other direction.

In FIG. 10, the relay 300 is shown with two separate electrically isolated windings, comprising a low voltage winding 304 and a high voltage winding 306. Separate windings electrically isolated are particularly advantageous in situations, for example in arc apparatus, where it is desired to ground one side of the work circuit, either the welding torch or the workpiece, and the source of reference is grounded. With the isolation thus provided, the work circuit and the reference circuit may be independently grounded without difficulty.

A type of null-seeking polarized differential relay suitable for use in the system shown herein is disclosed in U.S. Patent No. 2,443,784, issued June 22, 1948, to C. V. Bullen and C. J. Anderson, relays of which type are commercially available. With such a relay, a sensitivity of about plus or minus 0.1 volt has been observed on a 6-volt coil. For a helium arc of about 15 volts, this gives a sensitivity of plus or minus 0.25 volts, which corresponds to an arc length change of about plus or minus 0.003 inch. For an argon arc of about 9 volts, the sensitivity is plus or minus 0.15 volt, which corresponds to an arc length change of about plus or minus 0.010 inch.

The motor unit 302 is mechanically coupled to the rack 66 and provides the power for moving the electrode rod 34 and attached electrode 142 up or down to control the length of the arc. The operating winding of the motor for raising the electrode may be taken to be the winding shown schematically at 308, in which case the winding for lowering the electrode is the one shown at 310. Either motor when operated runs synchronously on the current from an alternating current supply 319 that also provides the reference voltage. A switch 377 may be provided for controlling the power supply. The motor moves by steps in a manner analogous to a ratchet and pawl device and does not coast when the power is removed. This property is advantageous in producing movement of the electrode without over-correction when the arc length changes for any reason. It is desirable also that the motor start quickly and accelerate rapidly. A suitable motor with these properties is disclosed in U.S. Patent No. 2,834,896, issued May 13, 1958, to C. P. Fisher, and motors of this type are commercially available. Motors of other suitable types may however be used. If desired, the motor assembly may be used to move the entire welding tool instead of only the electrode. In either case, a total travel of five-eighths inch to an inch or more may readily be obtained.

In the unit 302, two stepping motors are mounted on a common shaft for bi-directional control of the arc length. It was found that difficulty can arise under certain circumstances, due to one motor driving the other motor as an electric generator. As long as the generating winding is not electrically loaded the difficulty is not encountered. However, it is desirable to provide the operating contacts of the relay 300 with the usual spark reducing or damping circuit which normally comprises a series combination of a resistor and a capacitor, usually connected directly across the contacts that are to be protected from sparking. Since the stepping motors in the unit 302 are operated by alternating current, it will be noted that a spark damping circuit, if placed directly across the relay contacts, is in series between the alternating current source and an operating winding of a stepping motor, the relay contacts being in parallel with the damping circuit. Consequently, power is fed to the stepping motor to some extent regardless of whether the contacts are open or closed. This situation is undesirable and may be avoided by placing the damping circuit in parallel with the operating winding of the stepping motor, as shown in FIG. 10. There, a damping circuit comprising a serial combination of a resistor 312 and a capacitor 314 is shown connected in parallel with the stepping motor operating winding 308 and another damping circuit comprising a serial combination of a resistor 316 and a capacitor 318 is shown connected in parallel with the stepping motor operating winding 310. Now, either winding 308 or 310 may discharge through its damping circuit when its relay contact opens so that a spark is avoided or reduced at the contact, the same as if the damping circuit were connected directly across the contact but the path from the alternating supply source is broken at the open contact. Each damping circuit, however, now provides a load circuit for the motor winding in parallel therewith so that when, for example, the stepping motor with winding 308 is operating as a motor, the stepping motor with winding 310 is being driven as a generator which is electrically loaded by the damping circuit in parallel with its winding and produces a load on the motor. This load will exist as long as there is current flow in the load circuit of the generating winding 310. If by any means the current in the winding 310 is prevented or sufficiently reduced in strength, the load on the driving motor may be eliminated or reduced. For this purpose there is provided a capacitor 320 connecting together one end of each of the windings 308, 310 opposite the common connection 322 of these windings to the alternating current source. By proper selection of capacitance value in 320 and in some cases by the addition of a proper value of resistor 321, a voltage of proper magnitude and phase can be introduced to cancel the electromotive force generated in winding 310 and thus prevent its stepping motor acting as a generator with 316 and 318 as a load. When the stepping motor with winding 308 is being driven as a generator by the stepping motor with winding 310, the same capacitor 320 acts to impress upon the winding 308 an electromotive force counter to the electromotive force generated in winding 308. Resistor 321 in many cases will not be needed.

It has been discovered that the application of compensation to the idle motor at the proper phase and amplitude not only counteracts the generated electromotive force in that motor but also produces a current component that tends to cancel the field of the permanent magnet in the idle motor to reduce the latching or cogging effect therein. This latching or cogging effect of the idle motor is due to the combination of a permanent magnet in the motor stator and salient poles on the motor rotor. This current, however, is not thought to produce a torque in the idle motor in such direction as to aid the working motor, nor is it thought to act like a split-phase starting current.

The reference voltage may be derived from the alternating current source 319 which may be a 110 volt, 60 cycle power line. The two sides of the power line are connected to points 322 and 324 respectively. These points may be connected in turn to a full-wave bridge-type rectifier 326. The output of the rectifier may be connected to a series resistor 328 and voltage absorbing resistors 331, 332. Across the series combination of the rectifier 326 and resistor 328 may be connected a ripple reducing capacitor 334. The terminal of the resistor 332 remote from the resistor 331 may be connected to the high voltage winding 306 of the differential relay 300. The other terminal of the winding 306 may have a return connection to the lower terminal of the rectifier output. The voltage regulator tube 336, which may be a gas-filled diode, such as a neon tube, may be connected between the junction of resistors 331 and 332 and the lower output terminal of the rectifier 326. The tube 336 may have an ignition voltage of 110 volts, making it readily ignitible by the peak voltage of a 110 volt alternating current line, and having constant voltage drop across its terminal during regular operation of a suitable value such as 75 volts. By means of resistors 332, 331 and 328 the voltage across the winding 306 may be adjusted to a desired value such as 60 volts.

A voltage representative of the arc voltage may be obtained as by connecting the arc circuit in the desired polarity through a radio frequency choke coil 338, a normally closed contact 340 of a relay 342, and a rheostat 344 to one terminal of the low voltage winding 304 of the relay 300. The other terminal of the winding 304 may have a return connection to the other side of the arc circuit. A power ripple by-passing capacitor 346 may be connected in parallel with the winding 304. A voltmeter 348 may be connected between the junction of elements 344, 340 and the return line. By means of the rheostat 344, the voltage across the winding 304 may be adjusted to the desired value for any arc voltage over a considerable range. For example, 6 volts may be obtained across the winding 304 for arc voltages from 6 volts to about 22 volts. The operating relay winding 342 may be connected between the junction of elements 338 and 340 and the return line. A radio frequency by-pass capacitor 350 may be connected in parallel to the relay winding 342 and a pair of radio frequency by-pass condensers 352, 354 may also be connected in parallel with the winding 342 and capacitor 350 with a ground connection to the junction of the capacitors 352, 354.

The radio frequency choke coil 338 and the radio frequency by-pass capacitors 350, 352, 354, serve to choke and bypass the voltage of a spark-gap oscillator (not shown) which is usually made a part of the main power supply of the welding arc to facilitate starting and to stabilize the arc. In the circuit location shown in FIG. 10 these capacitors and the choke coil also serve to isolate radio frequency currents from the winding 304 of the differential relay 300.

The relay 342 may be a marginal relay, requiring a minimum voltage for operation, for example about 40 volts. On starting up operation and before the arc is struck, the voltage from the arc circuit is sufficiently high to operate the relay, thereby opening the contact 340 and protecting the voltmeter 348 and the winding 304 of the differential relay 300 from the open circuit voltage of the welding machine which may be 80 volts. After the arc has been struck, the arc voltage is reduced, for example to 15 volts for a helium arc and 10 volts for an argon arc. The relay 342 is then de-energized and the contact 340 is closed as required for further operation. The relay 342 also makes it possible to use a 25 volt full scale voltmeter 348 and thereby obtain the advantages of using an instrument having an expanded scale.

For the purpose of impressing alternating current upon the motor winding 308, 310 of the stepping motor unit 302 from the power line 319, connection may be made from one side of the power line as from point 324 through a fixed resistor 356 and a rheostat 358 to a movable arm 360 of a gang switch 330. In one-position of switch 330, connection may be made from arm 360 to a switch point 362 and thence to the transfer member of contacts 303 and 305 in the differential relay 300. Contacts 303 and 305 are connected respectively to one terminal each of the motor windings 308, 310 in the stepping motor unit 302, from which windings a common return connection may be made to the point 322 on the power line. For manual operation of the stepping motors, in three other positions of the switch arm 360 connection is made from the switch arm 360 to the movable arm of a manual transfer switch 364 by which current in the arm 360 may be sent to either the winding 308 or the winding 310 in the stepping motor unit 302.

The fixed resistor 356 and the adjustable resistor 358 may be used to limit the maximum operating current delivered to the stepping motor windings to a value which will minimize deterioration of the contact elements of the contacts 303, 305. As these contact elements are called upon for frequent operation during automatic regulation of the arc voltage, a reduction of the current at these contacts is highly desirable.

A control device 366 for controlling the supply of shielding gas to the arc and a control device 368 for controlling the supply of cooling water to the welding torch are connected to the switch 330 in such manner that the gas and water system may be purged before use and so that upon shutting down the welding circuit at the end of a weld the gas and water may be supplied during an additional period sufficient to protect the weld until the weld has congealed. One terminal each of devices 366 and 368 is connected to the power terminal 324 and to a movable arm 370 of the switch 330. In the off position of the switch 330 the arm 370 may be connected to a switch point 372 and thence to a time delay relay 374. The relay 374 may have a normally closed contact 376 which opens after the relay 374 has been energized for a measured length of time. The contact 376 connects the remaining terminals of the control devices 366, 368 and of the relay winding 374 to the point 322 on the power line. When the power switch 377 is closed and the switch arm 370 is not in contact with contact 372, the control devices 366, 368 operate to provide a continuous supply of shielding gas and cooling water to the welding torch in known manner. When the switch arm 370 is on the switch point 372, the time delay relay 374 measures out a predetermined time interval at the end of which it opens the contact 376, thereby shutting down the gas and water supply. Thereafter, when contact is next broken between switch arm 370 and switch point 372, power is removed from the time delay relay 374 and that device is immediately automatically reset to close the contact 376 and re-start the gas and water supply.

The switch 330 may have four positions as shown in FIG. 10, namely "Off," "Purge," "Start," and "Auto," the latter for automatic operation. The switch may have three movable contact arms as shown, in addition to an operating handle 378. The arm 360 controls as between operation of the stepping motor unit 302 either automatically by means of the differential relay 300 or manually by means of the switch 364. The arm 370 controls the operation of the time delay relay 374. A third arm 380 may be provided to close the operating circuit of a contactor in the welding circuit after the gas and water have been running through the welding torch to purge out impurities which may collect between uses of the apparatus. In the Start and Auto positions of the switch 330, the arm 380 completes through switch points 382, 384 the energizing circuit for closing the welding circuit contactor.

In the operation of the system of FIG. 10 it will be assumed at the start that the switch 377 is open and the switch 330 is on the Off position. Then, to ready the apparatus for welding, the switch 377 may be closed and the switch 330 may be moved to the Purge position. A pilot light 390 may be provided as shown, to come on whenever the switch 377 is in closed position. The closure of the switch 377 starts up the supply of shielding gas and cooling water to the welding torch. After a sufficient purging period, which may be judged by experience, the switch 330 may be moved to the Start position. In any one of these first three positions of the switch 330, with switch 377 closed, the stepping motors may be actuated manually to adjust the welding electrode to approximately the correct distance from the workpiece, by manual operation of the switch 364. In these three positions also, the gas and water are supplied to the torch. In the Start position, the arm 380 closes the control circuit through lines 386, 388. Automatic control of the arc voltage may be instituted by moving the switch 330 to the Auto position. Automatic operation may be interrupted without shutting down so that manual control of the arc length may be substituted by moving the switch to the Start position. Further purging may be done at any time by moving the switch 330 to the Purge position. If the switch 330 is moved to the Off position as at the completion of a weld or of a sequence of welding operations, the gas and water supplies continue for the time interval determined by the time delay relay 374 and are then shut off.

The neon tube 336 may be of a known type having a strap 392 in its base which disconnects winding 306 from its voltage supply if the tube is removed from its socket.

In the welding apparatus above described and illustrated in the drawings, the motor mechanism is of such small size that it may be mounted on the upper end of the welding torch for moving an electrode therein lengthwise of the torch barrel to space it from a workpiece relative to which the torch barrel is supported. It is, of course, apparent that a selfcontained welding torch or other device could be mounted on the block 88 of the motor mechanism to position this welding torch or device relative to another member on which or relative to which the motor mechanism is supported. As shown in FIGS. 3 and 4 of the drawings, the block 88 of the head 46 of the motor mechanism is provided with a threaded bolt hole 105 to the right of screw 104 which will receive the bolt for mounting a welding torch or other device for movement with the cylindrical rack member 66. Thus, a welding torch comparable in size to the motor mechanism above described may be mounted thereon to move relative to a workpiece and space the torch and the electrode therein from the workpiece relative to which the motor mechanism is supported. The motor mechanism of the resulting apparatus may be manually controlled or automatically controlled as in the above described apparatus in order to position the torch and its electrode relative to the workpiece to maintain an arc of predetermined length and voltage between the electrode and the workpiece.

It is, of course, apparent that the control system of FIG. 10 need not of necessity be used to operate the motor mechanism since other arrangements may be used for controlling the motor mechanism in accordance with the voltage variation of the welding arc established between the electrode and the workpiece. It is also apparent that other types of motors may be used in the motor unit 302 without departing from the invention. Thus a pair of rotary solenoids may be employed to produce rotary stepwise movement in opposite directions to propel the cylindrical rack member 66 of head 46.

While illustrative forms of apparatus and methods in accordance with the invention have been described and shown herein, it will be understood that numerous changes may be made without departing from the general principles and scope of the invention.

What is claimed is:

1. In arc welding apparatus, in combination, an electrode of extended length, means for moving said electrode with respect to a workpiece, said means having a travel range relatively small compared to the length of the electrode, manual means for controlling said electrode moving means, servo means for controlling said electrode moving means to maintain a substantially constant length of arc between said electrode and said workpiece, means to select either said manual means or said servo means, manually releasable gripping means connecting said electrode moving means to said electrode, and frictional means for holding said electrode in substantially fixed relationship to said workpiece while said gripping means is released, whereby the point of application of said electrode moving means relatively to said electrode may be changed by manual control while said gripping means is released and a new relative position of the electrode moving means and the electrode may be established during a welding operation without dismantlement of apparatus.

2. In arc welding apparatus, in combination, means for holding an electrode of extended length and for moving the same with respect to a workpiece, said means having a travel range relatively small compared to the length of the electrode, manual means for controlling said electrode moving means, servo means for controlling said electrode moving means to maintain a substantially constant length of arc between said electrode and workpiece, means to apply either said manual means or said servo means to said electrode moving means, manually controllable gripping means between the electrode moving means and the electrode, and means for holding the electrode in substantially fixed relationship to the workpiece while manually controlling said gripping means, whereby the point of application of the electrode moving means relatively to the electrode may be changed by manual control and a new relative position of the electrode moving means and the electrode may be established during a welding operation without dismantlement of apparatus.

3. In arc welding apparatus, in combination, an electrode holder, work supporting means, means for mounting said electrode holder in fixed relation to said work supporting means, frictional means for yieldably securing an electrode in said holder, motor driven means for moving said electrode with respect to said holder against friction in said frictional securing means, servo means for controlling said motor driven means to maintain substantially constant spacing between said electrode and a workpiece supported by said work supporting means, manual means for controlling said motor driven means, manually releasable gripping means connecting said motor driven means to said electrode, and means to select either servo or manual control of said motor driven means, whereby servo control may be suspended while said manually releasable gripping means is released and said manual control is used to secure a new grip of said motor driven means at a new position relative to said electrode during a welding operation without shutting down the welding apparatus or dismantling any portion thereof.

4. In arc welding apparatus, in combination, an electrode holder, means for yieldably securing an electrode in said holder, motor driven means for moving said electrode with respect to said holder against said yieldable means, servo means for controlling said motor driven means to maintain substantially constant spacing between the electrode and a workpiece, manual means for controlling said motor driven means, manually releasable gripping means connecting said motor driven means to the electrode, and means to select either servo or manual control of said motor driven means, whereby servo control may be suspended while said manually releasable gripping means is released and said manual control is used to secure a new grip by said motor driven means at a new position relative to the electrode during a welding operation without shutting down the welding apparatus or dismantling any portion thereof.

5. In a servo system, in combination, a pair of stepping motors either of which may operate as a generator when driven by the other motor, said motors being mounted for alternative operation in opposite directions upon a common shaft, individual supply lines for said motors, means for directing alternating current from a source of alternating current to either of said supply lines as required, individual spark-damping circuits for said motors, each said spark-damping circuit being connected in shunt to a winding of the respective motor, and an alternating current coupling path connecting said supply lines, whereby an alternating electromotive force is impressed upon the winding of the idle motor substantially compensating the electromotive force generated by the idle motor when driven by the active motor.

6. Apparatus according to claim 5, in which the said alternating current coupling path comprises a capacitor.

7. Apparatus according to claim 5, in which the said alternating current coupling path comprises a combination of a capacitor and a resistor.

8. In a servo system, in combination, a pair of stepping motors mounted for alternative operation in opposite directions upon a common shaft, each said motor including a winding and magnetic exciting means whereby either motor may operate as a generator when driven by the other motor, a transfer switch for directing current from an alternating current source to a winding of either motor as required, individual sparking-damping circuits for said motors, each said spark-damping circuit being connected in shunt to the respective motor winding, individual supply lines to each motor winding from said transfer switch, and an alternating current coupling path connecting said motor windings, whereby a compensating electromotive force is impressed upon the winding of the idle motor to oppose the electromotive force generated in the idle motor.

9. Apparatus according to claim 8, in which the said alternating current coupling path includes a capacitor.

10. Apparatus according to claim 8, in which the said alternating current coupling path comprises a serial combination of a capacitor and a resistor.

11. In arc welding apparatus, in combination, an electrode holder, means including a shaft selective rotation of which moves said electrode holder and an electrode therein to and from a workpiece, and a servo system including a pair of alternating current stepping motors, each of which has an operating winding and supply lines individual thereto and both of which have their rotating elements mounted on said shaft to provide selective rotation of said shaft in either direction to position said electrode relative to the workpiece, means responsive to an electrical characteristic of the welding circuit for selectively connecting said operating windings of said stepping motors through said individual supply lines to a source of alternating current to space the arcing terminal of an electrode in said holder a predetermined distance from the workpiece, individual spark-damping circuits for said motors, each of said spark-damping circuits being respectively connected in shunt to one of said operating windings of said stepping motors, and an alternating current coupling path connecting said supply lines, whereby an alternating electromotive force is impressed upon the operating winding of the idle stepping motor substantially compensating the electromotive force generated by an idle stepping motor when driven by an active stepping motor.

12. Apparatus according to claim 11, in which said alternating current coupling path comprises a capacitor.

13. Apparatus according to claim 11, in which said alternating current coupling path comprises a combination of a capacitor and a resistor.

14. In arc welding apparatus, in combination, an electrode holder, a servo system in which the forward and reverse feeding of said electrode holder and an electrode therein relatively to a workpiece is obtained by the selective rotation of a shaft in opposite direction by the selective energization of a pair of alternating current stepping motors, each of which has an operating winding and supply lines individual thereto and both of which have their rotating elements mounted on said shaft, and in which the selective energization of said operating windings of said stepping motors is under the control of a differential relay having two separate and distinct windings electrically isolated from one another and having contacts selectively operated by the relative magnitude of the energization of its said windings to selectively connect said operating windings of said stepping motors through said individual supply lines to a source of alternating current, said servo system including means for connecting one of said relay windings to a source of reference potential, means for connecting the other of said relay windings to be responsive to the potential between a workpiece and an electrode which is in said holder and connected in a welding circuit with said workpiece, individual spark-damping circuits for said motors, each of said spark-damping circuits being respectively connected in shunt to one of said operating windings of said stepping motors, and an alternating current coupling path connecting said supply lines, whereby an alternating electromotive force is impressed upon the operating winding of the idle stepping motor substantially compensating the electromotive force generated by said idle stepping motor when driven by the active stepping motor.

15. Apparatus according to claim 14, in which said alternating current coupling path includes a capacitor.

16. Apparatus according to claim 14, in which the said alternating current coupling path comprises a serial combination of a capacitor and a resistor.

17. In arc welding apparatus, in combination, a manually releasable electrode gripping means, a hollow barrel member enclosing said electrode gripping means and including a nozzle for supplying gas about the arcing terminal of an electrode in said electrode gripping means, means in said barrel member for holding an electrode located in said electrode gripping means in substantially fixed relationship with said barrel member when said electrode gripping means is operated to release said electrode, means for adjusting said barrel member to position its said nozzle relative to a workpiece, a stepping motor secured to said barrel member, reduction gearing for said motor including a pinion gear, a tubular rack member enclosing and making a driving engagement with said electrode gripping means, means for holding said rack member in sliding engagement with said barrel member and in driving engagement with said pinion gear, means in said barrel member for connecting the electrode therein and in said electrode gripping means to an arc welding circuit, and means responsive to an electrical characteristic of the welding circuit for energizing said stepping motor to move said rack and the electrode gripping means therein to position the electrode with its arcing terminal a predetermined distance from the workpiece while maintaining the position of said nozzle of said barrel member with respect to the workpiece.

(References on following page)

References Cited in the file of this patent

UNITED STATES PATENTS

| | | |
|---|---|---|
| 1,277,000 | Turner | Aug. 27, 1918 |
| 1,897,990 | Smyser | Feb. 14, 1933 |
| 2,360,160 | Pickhaver | Oct. 10, 1944 |
| 2,443,784 | Bullen et al. | June 22, 1948 |
| 2,528,414 | Bieling | Oct. 31, 1950 |
| 2,628,325 | Schaefer | Feb. 10, 1953 |
| 2,653,283 | Feldhausen | Sept. 22, 1953 |
| 2,691,715 | Flora | Oct. 12, 1954 |
| 2,752,469 | Price | June 26, 1956 |
| 2,805,373 | Bonnell | Sept. 3, 1957 |
| 2,929,974 | Wells | Mar. 22, 1960 |